(No Model.)
H. P. WHITE.
COMBINED ROLLER AND PULVERIZER.
No. 343,619. Patented June 15, 1886.
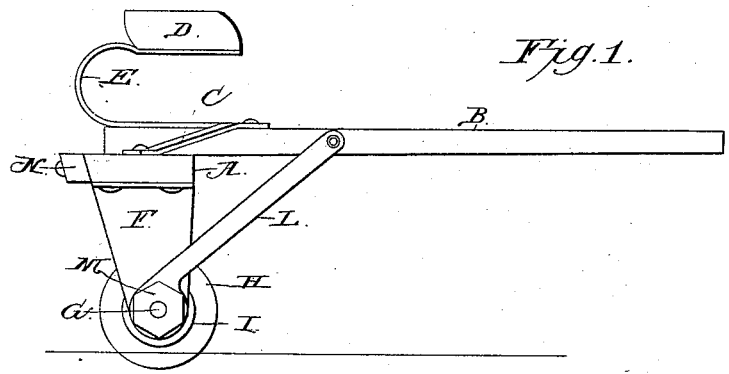
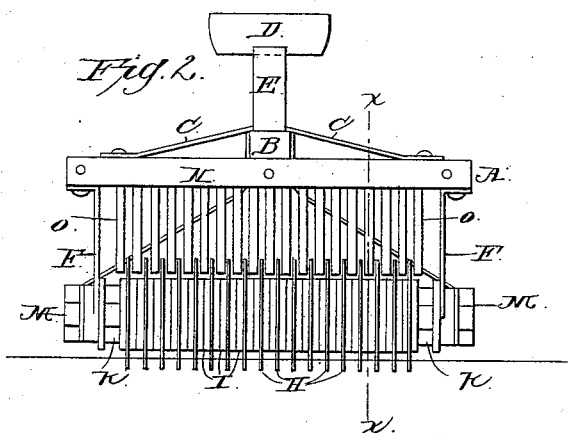
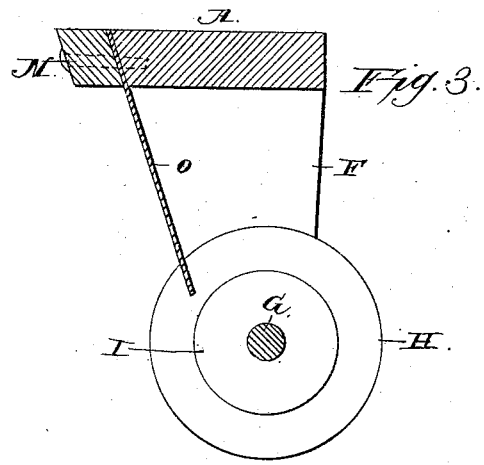
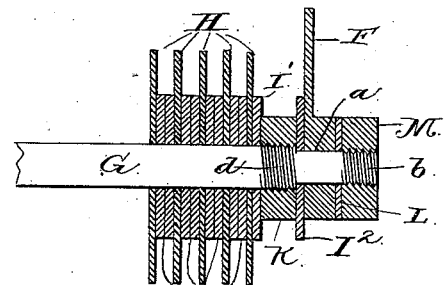
Witnesses
M. E. Fowler
J. W. Garner
Inventor
H. P. White
By his Attorneys

UNITED STATES PATENT OFFICE.

HENRY PARKER WHITE, OF PAW PAW, MICHIGAN, ASSIGNOR OF ONE-HALF TO C. S. MAYNARD, OF SAME PLACE.

COMBINED ROLLER AND PULVERIZER.

SPECIFICATION forming part of Letters Patent No. 343,619, dated June 15, 1886.

Application filed February 24, 1886. Serial No. 193,063. (No model.)

*To all whom it may concern:*

Be it known that I, HENRY PARKER WHITE, a citizen of the United States, residing at Paw Paw, in the county of Van Buren and State of Michigan, have invented a new and useful Improvement in Combined Rollers and Pulverizers, of which the following is a specification, reference being had to the accompanying drawings.

My invention relates to an improvement in combined rollers and pulverizers; and it consists in the peculiar construction and combination of devices, that will be more fully set forth hereinafter, and particularly pointed out in the claim.

In the drawings, Figure 1 is a side elevation of my invention. Fig. 2 is a rear elevation of the same. Fig. 3 is a transverse sectional view taken on the line $x$ $x$, Fig. 2. Fig. 4 is a detail sectional view taken through the cutting-disks and the interposed washers.

A represents a platform or frame, to which is bolted the tongue B. Brace-bars C, which are made of metal, are secured to the outer ends of the platform and to the tongue, to strengthen and brace the latter.

D represents the driver's seat, which is supported on the upper end of the curved flat spring E, which is secured on the rear upper side of the tongue. On the under side of the ends of the platform are bolted depending hangers F, the lower ends of which form journals or bearings for the roller-shaft G. The ends of this shaft which work in the said bearings are reduced, as at $a$, and at the outer ends of the reduced portions are cut the screw-threads $b$, which screw-threads are right and left handed at opposite ends of the shaft. The ends of the enlarged portion of the shaft G, between the inner sides of the bearings, are provided with screw-threads $d$, which are likewise right and left handed at opposite ends.

H represents a series of circular cutting-disks, which are preferably made of steel, and which are strung on the shaft G, and I represents a series of washers, which are of suitable width, of less diameter than the disks H, and are also strung on the shaft G, the said washers being interposed between each of the series of disks, so as to keep the latter at a suitable distance apart throughout the length of the shaft.

On the outer sides of the outer disks H are placed washers I', and on the threaded portions $d$, near the ends of the shaft, are screwed clamping-nuts K, which secure the series of disks and washers firmly to the shafts. Washers I² are interposed between the clamping-nuts and the inner sides of the journals of the hangers F, to prevent dirt and grit from entering the said journals and injuring the shafts.

L represents spring brace-rods, which are secured at their front ends to opposite sides of the tongue, and have openings in their rear ends, which are passed over the outer ends of the shaft G. Nuts M are screwed onto the threaded ends $d$ of the shaft, so as to clamp the spring-rods against the bearings on the hangers F.

The rear edge of the platform A is beveled, as shown, and to this beveled edge is bolted a clamping-strip, N. In between the said strip and the beveled edge of the platform are interposed the upper ends of a series of spring comb-teeth, O, which extend down between the series of circular disks and bear between them the lower ends of the said spring comb-teeth extending nearly to the washers I. One of the spring comb-teeth extends between each pair of the circular disks, and a similar tooth also bears on the outer side, as each of the end disks is shown in Fig. 2. As the machine is drawn along over the ground, the circular disks enter and cut the soil to a considerable depth. As the disks rotate, the dirt is raised with them until it reaches the lower ends of the spring comb-teeth, which scrapes the dirt from the opposing faces of the disks and causes it to fall to the ground, thus thoroughly mixing and pulverizing and placing the ground in first-rate condition to be planted.

By making the shaft, disks, and washers detachable the disks may be spaced to any desired distance apart by inserting one or more washers between each pair, and thus the soil may be pulverized to any desired degree of fineness.

Having thus described my invention, I claim—

The combination of the frame having the bearings or hangers F and of the roller and pulverizer, comprising the shaft G, having the threaded portions $d\ b$ and the intermediate plain portion, $a$, journaled in the bearings or hangers, and the clamping-nuts K M on the threaded portions $d\ b$ on each side of the bearings, as set forth.

In testimony that I claim the foregoing as my own I have hereto affixed my signature in presence of two witnesses.

HENRY PARKER WHITE.

Witnesses:
H. L. MAYNARD,
W. S. MAYNARD.